United States Patent

Kitani et al.

Patent Number: 5,338,998
Date of Patent: Aug. 16, 1994

[54] VIBRATION DRIVEN ACTUATOR

[75] Inventors: Koji Kitani, Chofu; Toru Nakanishi, Yokohama, both of Japan

[73] Assignee: Canon Kabushiki Kaisha, Tokyo, Japan

[21] Appl. No.: 142,121

[22] Filed: Oct. 28, 1993

Related U.S. Application Data

[63] Continuation of Ser. No. 14,221, Feb. 5, 1993, abandoned.

[30] Foreign Application Priority Data

Feb. 6, 1992 [JP] Japan .................. 4-021163

[51] Int. Cl.⁵ .................................. H01L 41/08
[52] U.S. Cl. .................................... 310/323
[58] Field of Search ............................ 310/323, 328

[56] References Cited

U.S. PATENT DOCUMENTS

| | | | |
|---|---|---|---|
| 4,580,073 | 4/1986 | Okumura et al. | 310/323 |
| 4,736,129 | 4/1988 | Endo et al. | 310/323 |
| 4,739,212 | 4/1988 | Imasaka et al. | 310/323 |
| 4,914,338 | 4/1990 | Murakami | 310/323 |
| 4,926,085 | 5/1990 | Sawayama et al. | 310/323 |
| 4,939,404 | 7/1990 | Inagaki et al. | 310/323 |
| 5,034,646 | 7/1991 | Shirasaki | 310/323 |
| 5,059,849 | 10/1991 | Sumihara et al. | 310/323 |
| 5,150,000 | 9/1992 | Imasaka et al. | 310/323 |
| 5,187,406 | 2/1993 | Seki | 310/323 |

FOREIGN PATENT DOCUMENTS 0023075  1/1990  Japan .................. 310/323

Primary Examiner—Mark O. Budd
Attorney, Agent, or Firm—Fitzpatrick, Cella, Harper & Scinto

[57] ABSTRACT

As a combination of sliding members of a vibration member and a driven member in a vibration driven motor or actuator, one member adopts an aluminum alloy containing dispersed Si (silicon), and the other member adopts a PTFE resin filled with polyimide.

20 Claims, 2 Drawing Sheets

VIBRATION DRIVEN ACTUATOR

This application is a continuation of application Ser. No. 08/014,221 filed Feb. 5, 1993 now abandoned.

BACKGROUND OF THE INVENTION

1. Field of the Invention

The present invention relates to a vibration driven motor or actuator for relatively moving a vibration member and a member urged against the vibration member by a travelling vibration wave generated in the vibration member and, more particularly, to a material of a sliding member in an urging contact portion.

2. Related Background Art

The principle of a vibration driven motor or actuator utilizing a travelling vibration wave will be briefly described below. A vibration member (stator) is constituted by fixing two groups each of a plurality of piezoelectric elements arranged in the circumferential direction on one surface of a ring-shaped elastic member having a total length corresponding to an integer multiple of a given length $\lambda$ and formed of an elastic material. In each group, the piezoelectric elements are arranged at a pitch of $\lambda/2$ to have opposite polarities so as to alternately exhibit opposite expansion/contraction characteristics, and the two groups of elements are arranged to have a shift corresponding to an odd-number multiple of $\lambda/2$ therebetween. Electrode films are provided to the two groups of piezoelectric elements. When an AC voltage is applied to either group (to be referred to as an A phase hereinafter) alone, the vibration member generates, over the entire circumference thereof, a standing wave (wavelength $\lambda$) of a bending vibration having loop positions at the central points of the piezoelectric elements in the two groups, and at points separated therefrom at every $\lambda/2$ intervals, and having node positions at the central points between two each adjacent loop positions. When an AC voltage is applied to the other group (to be referred to as a B phase hereinafter) alone, a standing wave is similarly generated, but the loop and node positions of the wave are shifted by $\lambda/4$ from the standing wave generated by the A phase. When AC voltages having the same frequency and a temporal phase difference of 90° therebetween are simultaneously applied to the A and B phases, since the standing waves of the two phases are synthesized, a traveling wave (wavelength $\lambda$) of a bending vibration vibrating in the circumferential direction is generated in the vibration member. At this time, each point on the elastic member having a given thickness makes an elliptic motion. Therefore, when, e.g., a ring-shaped movable member (rotor) is urged against one surface of the elastic member, the movable member is rotated upon reception of the circumferential frictional force from the elastic member. It is known that when a plurality of radial grooves are formed in the circumferential direction on a surface, opposite to the piezoelectric element fixing surface, of the vibration member so as to increase the number of circumferential components of the elliptic motion, a neutral plane of a vibration is moved toward the piezoelectric element fixing surface, and the rotational speed is increased if the amplitude remains the same, thus remarkably improving motor efficiency. These grooves also have an effect of receiving a wear powder.

Based on the above-mentioned principle, the vibration driven motor or actuator has the following merits.

1) The motor has a holding torque in a non-energization state, and does not cause hunting.

2) Since the motor has a small inertia and a large driving torque, the rising and falling times of rotation are short (mechanical time constant is small).

3) Since all points on the circumference generate equal driving force, no cogging occurs.

With these merits, the vibration driven motor or actuator is suitable for high-precision rotation and high-precision positioning. However, since the motor utilizes the frictional force and the resonance of vibrations, it also suffers from the following demerits.

1) Since a sliding portion is worn, motor performance changes due to a change in frictional surface over time.

2) Since the resonance state and the coefficient of friction depend on temperature, temperature characteristics of motor performance are poor.

3) Since the heat generation amount is large relative to the volume of the motor, a considerable temperature rise occurs, and an adhered layer may be softened or damaged (peeled).

Therefore, in consideration of these merits and demerits, aluminum, phosphor bronze, stainless steel, or the like is used as needed as a material of the motor so as to satisfy the following requirements:

1) The motor must have high wear-resistance characteristics (to maintain motor performance for a long period of time).

2) The motor must have a high heat conductivity (to improve heat dissipation, thereby preventing a change in motor characteristics upon a change in temperature and a thermal damage to the motor).

3) The elastic member must have a thermal expansion coefficient close to that of an electro-mechanical conversion element (e.g., a piezoelectric element) (to prevent a damage to an adhered layer caused upon a change in temperature).

4) The movable member must have a light weight (to decrease the inertia).

In order to prevent a temperature rise as much as possible, a material having a high heat conductivity is preferable, and in order to realize a compact, lightweight structure and, especially, to decrease the inertia, a material having a low density is preferable. As a material having both these characteristics, an aluminum material is preferable.

As a material used in combination with the above-mentioned material, there are proposed composite resins causing a relatively small wear, and resins added with fillers having a reinforcement effect such as a fiber, a whisker, and the like, or added with fillers having a lubrication effect such as polytetrafluoroethylene ( PTFE ), molybdenum disulfide, graphite, and the like.

Since PTFE has a very low coefficient of friction even in a non-lubrication state, it is popularly used as a sliding material. PTFE molecules are transferred to a member contacting thereto due to the laminar peeling effect caused by a molecular coupling state, and cause friction between the PTFE molecules themselves, thus obtaining a stable low coefficient of friction. At the same time, the PTFE itself is worn considerably, and easily causes a creep. Therefore, the PTFE has a demerit of poor start performance after it is left for a while. As countermeasures against a wear and creep, PTFE filled with glass fiber, carbon fiber, aromatic polyester powder, polyimide powder, or the like has been proposed. However, since most of such fillers have certain hardness, a member to be brought into contact with the PTFE must be selected to have certain surface hardness so as to prevent a wear.

However, when the vibration driven motor is slid while a normal Cu-, Mg-, or Si-based aluminum material is in contact with the above-mentioned filled PTFE, aluminum as the base material is worn under the attack of the filler, and a wear powder of the aluminum is produced between the sliding surfaces. For this reason, transfer of the PTFE is disturbed, and only a wear occurs. Therefore, the sliding surface of the aluminum is subjected to various hardening treatments to prevent production of a metal wear powder.

However, in order to perform such a hardening treatment, pre- and post-surface treatments are required, resulting in a disadvantage in terms of cost. In addition, a hardened layer comprising an oxide film formed by plating or anodic oxidation easily falls off from a sliding portion, and the fallen powder is caught in the sliding portion, thus often causing a severe wear.

SUMMARY OF THE INVENTION

It is an object of the present invention to provide a vibration driven motor or actuator, which does not easily cause a temperature rise (has a high heat conductivity), and has a small rotational inertia.

It is another object of the present invention to provide a vibration driven motor or actuator, which can prevent a member contacting a sliding member from being worn, has good rotation characteristics, and has a long service life.

Other objects of the present invention will become apparent from the following detailed description.

According to one aspect of the present invention, there is provided a vibration driven motor or actuator, in which as a combination of sliding materials of sliding members of a vibration member and a driven member, an aluminum alloy containing dispersed Si (silicon) is used for one member, and a PTFE resin filled with polyimide is used for the other member, so that the motor or actuator does not easily cause a temperature rise (has a high heat conductivity), and has a small rotational inertia.

According to another aspect of the present invention, there is provided a vibration driven motor or actuator, in which 20 to 50 wt. % of silicon powder are used as a filler for the aluminum alloy, so that the motor or actuator prevents a member contacting a sliding member from being worn by polyimide, has good rotation characteristics, and has a long service life.

DESCRIPTION OF THE PREFERRED EMBODIMENTS

Figure 1:
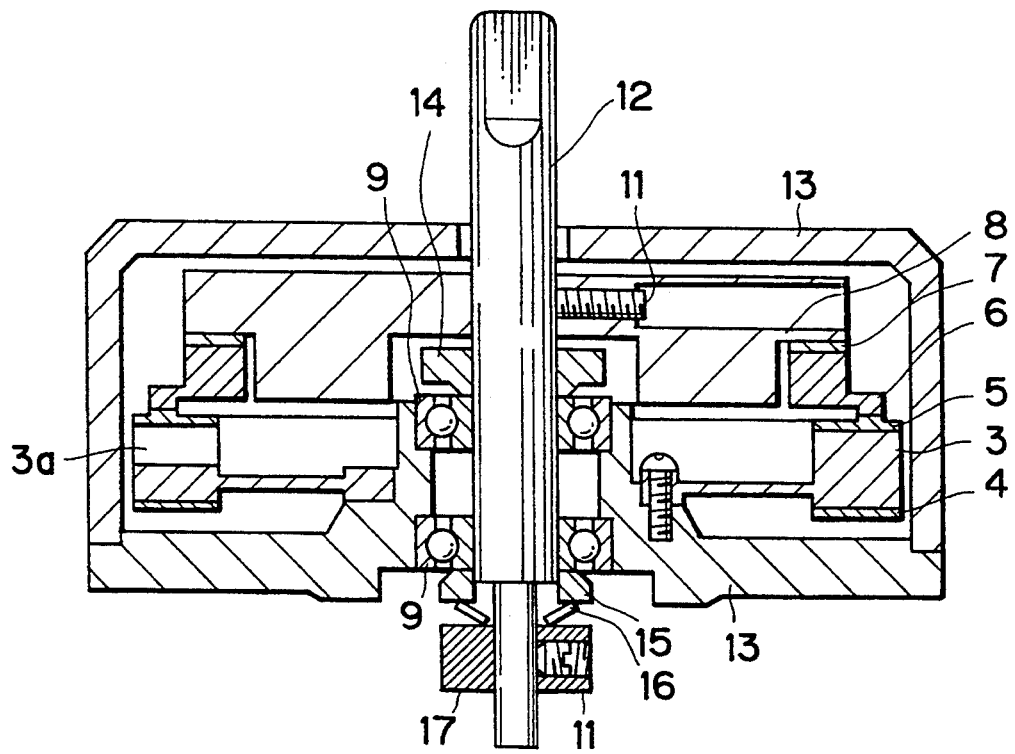
FIG. 1 is a sectional view showing a vibration driven motor or actuator according to an embodiment of the present invention.

FIG. 1 shows a vibration driven motor or actuator according to an embodiment of the present invention.

In FIG. 1, a vibration member 1 is prepared as follows. A piezoelectric element group obtained by forming two groups each of a plurality of piezoelectric elements 4, which have different polarities, as described above, in a ring shape is concentrically adhered using a heat-resistant epoxy resin-based adhesive onto one end face of a ring-shaped metal elastic member 3 and formed of, e.g., stainless steel, phosphor bronze, or an aluminum alloy. Also, a sliding member 5 formed of a composite resin, which contains a polytetrafluoroethylene (PTFE) resin etched for giving adhesion characteristic as a base material, and is filled with 10 vol. % to 40 vol. % of at least one of aromatic polyimide, thermosetting polyimide, a pitch-based carbon fiber, and a molybdenum disulfide powder, is similarly adhered onto the other end face of the elastic member 3. On the resin-side surface of the vibration member, a plurality of interdigital grooves (described in, e.g., U.S. Pat. No. 4,580,073) are regularly formed in the circumferential direction so as to improve motor efficiency.

A movable member 2 is prepared by attaching a ring-shaped sliding member 6 formed of an aluminum alloy containing dispersed Si onto a support member 8 via a rubber ring 7. The support member 8 is fixed to an output shaft 12 by a screw 11.

The sliding surface of the vibration member 1 and the sliding surface of the movable member 2 are urged against each other at a load of, e.g., 10 kgf in the axial direction by a compression leaf spring 16. The motor or actuator shown in FIG. 1 also includes a bearing 9, a cover 13, pressurizing collars 14 and 15, and a collar 17. The sliding surface of the vibration member preferably has a step of 0.5 mm or less so as to efficiently transmit a vibration since the PTFE composite resin has a small modulas of elasticity, although the step width varies depending on the wear margin of each vibration driven motor.

When AC voltages having the natural frequency of the vibration member 1 are applied to the two groups of piezoelectric elements, which alternately have different polarities in the direction of thickness, the vibration member 1 resonates, and generates a travelling vibration wave in its circumferential direction. As a result, the movable member 2 urged against the vibration member 1 is rotated by the frictional force between the sliding surfaces of the vibration member 1 and the movable member 2.

As the sliding member 5 of the vibration member 1, a member formed of a PTFE resin filled with 20 vol. % of thermosetting polyimide was prepared, and two samples of the sliding member 6 of the movable member 2, i.e., a sample A which was formed of an aluminum alloy containing 25 wt. % of silicon powder, and a sample B which was formed of A5056 (an Mg-based aluminum alloy) as a comparative example were prepared. Motors including these samples were continuously rotated at 100 rpm for 200 hours, and the wear states were observed. With the sample A, the wear amount of the PTFE composite resin was about 4 μm, and the thickness of the aluminum alloy was slightly increased.

In contrast to this, with the sample B, the wear amount of the PTFE composite resin was increased to 10 times or more that of the sample A, i.e., about 70 μm, and the aluminum alloy was also worn by 10 μm or more, and its surface was roughened very much in the radial direction. A black wear powder became attached to the surface of the PTFE composite resin, and this revealed that the wear powder of the aluminum alloy was embedded in the PTFE composite resin.

From the above-mentioned results, it was considered that the aluminum alloy (A5056) was worn under the attack of the thermosetting polyimide. Conversely, the reason why the aluminum alloy containing dispersed Si was not worn by polyimide, although it also contained aluminum as a base material, was estimated as follows. That is, the surface was not fluidized due to the effect of silicon powder, and hence, did not cause a plastic deformation as a cause of a wear. The vibration driven motor of the sample A was rotated without noise from the beginning to the end, while the vibration driven motor of the sample B generated noise from time to time during driving. From this result as well, the superiority of the combination of the aluminum alloy containing dispersed Si and the PTFE resin filled with the thermosetting polyimide was confirmed.

Furthermore, a PTFE resin filled with 20 vol. % of aromatic polyimide, which had a small own wear amount but considerably attacked a member contacting thereto, was also evaluated by the continuous rotation tests of the samples A and B. The same results as in the case of the PTFE resin filled with the thermosetting polyimide were obtained.

From the above-mentioned results, it was found that the sample A had a high wear resistance. Then, the following samples D, D, E, and F were prepared by filling a pitch-based carbon fiber (CF), a PAN-based CF, and molybdenum disulfide ($MoS_2$) in a PTFE resin.

Sample C: pitch-based CF=20 vol. %, $MoS_2$=5 vol. %, PI=5 vol. %, and PTFE=Bal.

Sample D: PAN-based CF=20 vol. %, $MoS_2$ =5 vol. %, PI=5 vol. %, and PTFE=Bal.

Sample E: pitch-based CF=20 vol. %, $MoS_2$=5 vol. %, and PTFE=Bal.

Sample F: pitch-based CF20 vol. %, and PTFE=Bal.

These samples were evaluated by the continuous rotation tests together with the sample A. With only the sample D, a very large wear was observed, and the same result as that of the combination of the polyimide filled PTFE resin and the sample B was obtained.

In contrast to this, the wear amounts of the samples C, E, and F were respectively 10 μm or less, and the order of wear amounts was:

Sample C < Sample E < Sample F The sample A caused a concentrical wear of about 1 to 3 μm. However, a PTFE coat was observed on the surface of the sample A. Thereafter, a continuous rotation test for another 1,000 hours was conducted. After this test, no progress in the wear of the sample A was found, and it was confirmed that a wear could be prevented by the PTFE coat.

The sample C had a coefficient of friction as large as 1.5 to 1.8 times that of the PTFE resin filled with 20 vol. % of aromatic polyimide, and a motor output could become about 1.5 times. Therefore, the sample C could attain a high-torque, high-efficiency motor.

Molybdenum and polyimide were detected from the PTFE coat by an analysis such as FT-IR, XMA, or the like. Thus, it was considered that the above-mentioned wear order was obtained since $MoS_2$ and polyimide as fillers served to reinforce the PTFE coat.

For example, when a vibration member is urged as a movable member against a flat support member, and the vibration member itself is moved by a travelling vibration wave generated on the vibration member, the flat support member may be formed of an aluminum alloy containing dispersed Si, and a PTFE composite resin may be adhered to the vibration member like in this embodiment.

Alternatively, a vibration driven motor having a high wear resistance and a high heat conductivity can also be obtained in such a manner that the vibration member is formed of an aluminum alloy containing dispersed Si, and a PTFE composite resin is adhered to the movable member. However, in this case, when this motor is left unused for a long period of time, the PTFE resin contacting the interdigital grooves causes a creep, and a step is formed in the circumferential direction. As a result, the start characteristics of the motor may be impaired, and rotation immediately after the motor is started may become unstable (rotation unevenness may become large). For these reason, a driving method must be carefully selected. However, in the case of continuous rotation for a long period of time, this structure is advantageous in terms of the wear amount and rotation precision since a wear powder can be easily eliminated.

Aluminum alloys having various Si contents (e.g., from 20 wt. % to 50 wt. %) are commercially available. When materials within this range were used, formation of the PTFE transfer film was observed, and the materials were not worn by the PTFE composite resin.

When the content of fillers is 10 vol. % or less, no significant effect can be obtained; when it exceeds 40 vol. %, the transfer film cannot be easily formed, and is formed in a spotted pattern, thus impairing wear characteristics. As a result, motor performance cannot be stabilized.

Figure 2:
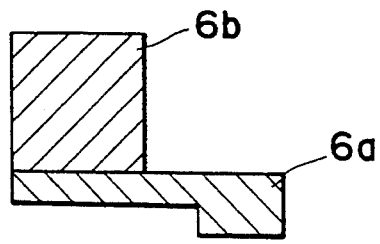
FIG. 2 is a partial sectional view showing another embodiment of a movable member.
Figure 3:
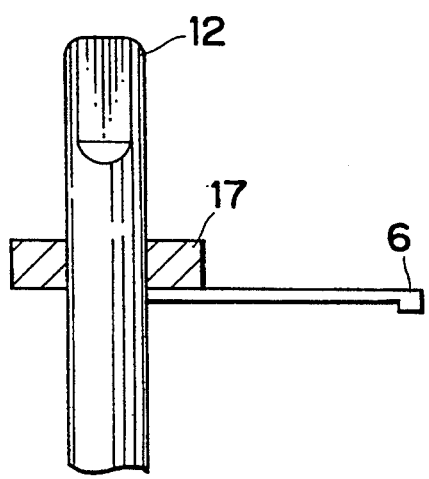
FIG. 3 is a partial sectional view showing still another embodiment of a movable member.

As a structure of the movable member 2, as shown in FIG. 2, a sliding member 6a and a support member 6b may be separately formed, or as shown in FIG. 3, the collar 17 may be shrink-fitted on the shaft 12 so as to decrease the inertia.

Furthermore, when this motor (or actuator) is used as a driving source for a camera, a semiconductor printing apparatus, or the like, and is used for driving a lens or conveying a wafer, a quiet system can be realized.

As described above, according to the present invention, as a combination of sliding materials of sliding members of a vibration member and a driven member in a vibration driven motor or actuator, one member adopts an aluminum alloy containing dispersed Si (silicon), and the other member adopts a composite resin prepared by filling one of aromatic polyimide, thermosetting polyimide, a pitch-based carbon fiber, and a molybdenum disulfide powder in a polytetrafluoroethylene resin as a base material, thus obtaining a vibration driven motor, which does not easily cause a temperature rise (has a high heat conductivity), and has a small rotational inertia. In addition, when 20 to 50 wt. % of silicon powder are used as a filler for the aluminum alloy, a vibration driven motor which can prevent a wear caused by the filler in the PTFE composite resin, is free from noise, has good rotation performance, and has a long service life, can be obtained.

What is claimed is:

1. A vibration driven motor or actuator comprising:
a vibration member for generating a vibration wave by an applied electrical signal and having a first contact surface; and
a contacting member having a second contact surface which frictionally contacts the first contact surface of said vibration member and for receiving the vibration generated in said vibration member,
wherein one of said first and second contact surfaces is formed of a composite resin prepared by filling one of aromatic polyimide, thermosetting polyimide, a pitch-based carbon fiber, and a molybdenum disulfide powder in a polytetrafluoroethylene resin as a base material, and the other contact surface is formed of an aluminum alloy containing silicon powder.

2. A vibration driven motor or actuator according to claim 1, wherein said composite resin is a thermosetting polyimide.

3. A vibration driven motor or actuator according to claim 1, wherein a content of the thermosetting polyimide falls within a range from 10 vol. % to 40 vol. %.

4. A vibration driven motor or actuator according to claim 1, wherein said composite resin is a aromatic polyimide.

5. A vibration driven motor or actuator according to claim 1, wherein a content of said aromatic polyimide is 20 vol. %.

6. A vibration driven motor or actuator according to claim 1, wherein a content of said silicon powder falls within a range from 20 wt. % to 50 wt. %.

7. A vibration driven motor or actuator according to claim 1, wherein a content of said silicon powder is 25 wt. %.

8. A vibration driven motor or actuator according to claim 1, wherein said composite resin is provided on ridges formed in an interdigital pattern.

9. A vibration driven motor or actuator according to claim 1, wherein said vibration member has a plurality of ridges formed in an interdigital pattern, and said composite resin is provided on said ridges.

10. A vibration driven motor or actuator according to claim 9, wherein said contact member is rotatably supported at a predetermined position.

11. A vibration wave driven motor or actuator comprising:
a vibration member for generating a vibration travelling wave by an applied electrical signal and having a first contact surface; and
a contacting member having a second contact surface which frictionally contacts the first contact surface of said vibration member and for receiving the vibration travelling wave generated in said vibration member,
wherein one of said first and second contact surfaces is formed of a composite resin prepared by filling one of aromatic polyimide, thermosetting polyimide, a pitch-based carbon fiber, and a molybdenum disulfide powder in a polytetrafluoroethylene resin as a base material, and the other contact surface is formed of an aluminum alloy containing silicon powder.

12. A vibration wave driven motor or actuator according to claim 11, wherein said composite resin is a thermosetting polyimide.

13. A vibration wave driven motor or actuator according to claim 11, wherein a content of the thermosetting polyimide falls within a range from 10 vol. % to 40 vol. %.

14. A vibration wave driven motor or actuator according to claim 11, wherein said composite resin is a aromatic polyimide.

15. A vibration wave driven motor or actuator according to claim 11, wherein a content of said aromatic polyimide is 20 vol. %.

16. A vibration wave driven system comprising:
a vibration member for generating a vibration wave by an applied electrical signal and having a first contact surface; and
a rotor having a second contact surface which frictionally contacts the first contact surface of said vibration member and for receiving the vibration wave generated in said vibration member,
wherein one of said first and second contact surfaces is formed of a composite resin prepared by filling one of aromatic polyimide, thermosetting polyimide, a pitch-based carbon fiber, and a molybdenum disulfide powder in a polytetrafluoroethylene resin as a base material, and the other contact surface is formed of an aluminum alloy containing silicon powder; and
a member for driving a load of the system by a rotational force of said rotor.

17. A vibration wave driven system according to claim 16, wherein said composite resin is a thermosetting polyimide.

18. A vibration wave driven system according to claim 16, wherein a content of the thermosetting polyimide falls within a range from 10 vol. % to 40 vol. %.

19. A vibration wave driven system according to claim 16, wherein said composite resin is a aromatic polyimide.

20. A vibration wave driven system according to claim 16, wherein a content of said aromatic polyimide is 20 vol. %.

* * * * *

UNITED STATES PATENT AND TRADEMARK OFFICE
CERTIFICATE OF CORRECTION

PATENT NO. : 5,338,998
DATED : August 16, 1994
INVENTOR(S) : KOJI KITANI, ET AL.

It is certified that error appears in the above-identified patent and that said Letters Patent is hereby corrected as shown below:

<u>COLUMN 1</u>

Line 29, "$\lambda/2$" should read --$\lambda/4$--.

<u>COLUMN 5</u>

Line 22, "samples D," should read --samples C,--.
Line 28, close up right margin.
Line 41, "Sample F" should read --Sample F ¶--.

<u>COLUMN 7</u>

Line 10, "a" should read --an--.

<u>COLUMN 8</u>

Line 11, "a" should read --an--.
Line 41, "a" should read --an--.

Signed and Sealed this

Eighteenth Day of April, 1995

Attest:

BRUCE LEHMAN

*Attesting Officer*  *Commissioner of Patents and Trademarks*